(12) United States Patent
Roberts, Jr.

(10) Patent No.: US 6,640,679 B1
(45) Date of Patent: Nov. 4, 2003

(54) COLLET ADAPTER CHUCK ASSEMBLY WITH AXIALLY FIXED COLLET HEAD

(75) Inventor: Matthew C Roberts, Jr., Bath, NY (US)

(73) Assignee: Hardinge, Inc., Elmira, NY (US)

( * ) Notice: Subject to any disclaimer, the term of this patent is extended or adjusted under 35 U.S.C. 154(b) by 0 days.

(21) Appl. No.: 10/228,256

(22) Filed: Aug. 27, 2002

(51) Int. Cl.[7] ............................................... B23B 31/00
(52) U.S. Cl. ........................... 82/165; 279/50; 279/143; 82/166
(58) Field of Search .................... 82/165, 166, 168; 279/143, 142, 50, 46.1

(56) References Cited

U.S. PATENT DOCUMENTS

| | | | | |
|---|---|---|---|---|
| 4,852,437 A | * | 8/1989 | DeBruyne | 82/165 |
| 5,471,900 A | * | 12/1995 | Corwin et al. | 82/1.11 |
| 5,653,453 A | * | 8/1997 | Nakamoto | 279/50 |
| 5,967,713 A | * | 10/1999 | Watzke | 408/239 |

* cited by examiner

Primary Examiner—Willmon Fridie, Jr.
(74) Attorney, Agent, or Firm—Pillsbury Winthrop LLP

(57) ABSTRACT

A collet chuck assembly for an axially fixed collet head. The collet head is fixedly and removably mounted in a threaded bushing to prevent axial motion, and is keyed into place to prevent rotation. A sleeve assembly has cam surfaces adapted to engage the cam surfaces of the collet head to open and close the collet head, and slides between collet head open and collet head closed positions within a spindle adapter body. The sleeve assembly has projections that extend from a rearward portion and pass through appropriately sized passages in the axially-fixed bushing. Motion from a spindle drawbar is transmitted by a drawbar link-up through the projections of the sleeve assembly. Using this arrangement, no physical connection is required between the drawbar link-up and the sleeve assembly. Additionally, no cap assembly is required.

26 Claims, 4 Drawing Sheets

COLLET ADAPTER CHUCK ASSEMBLY WITH AXIALLY FIXED COLLET HEAD

BACKGROUND OF THE INVENTION

1. Field of the Invention

The present invention relates to collet chucks for holding a tool or workpiece on a spindle of a turning machine.

2. Description of Related Art

Collet chucks are used to clamp or grip workpieces or tools in turning machines, such as lathes. The collet head inside the chuck includes a number of circumferentially-spaced gripping segments and a number of cam surfaces. When the collet head is moved axially, its cam surfaces interact with corresponding opposing surfaces or cams on the mounting fixture. The interaction of the opposing cam surfaces causes the gripping segments of the collet head to expand or contract, thus causing it to grip or release a workpiece or tool, depending on the direction of axial movement.

Collet chucks are commonly used in place of other types of chucks, especially for smaller workpieces, because they are typically more accurate and can transmit more torque than a conventional chuck, such as a jaw chuck. Another advantage of collet chucks is that they maintain their grip at high rotational speeds, whereas the centrifugal forces present at high rotational speeds may cause a conventional jaw chuck to loosen its grip on the workpiece.

In conventional collet chucks, the axial movement required to grip the workpiece also moves the workpiece. This can be undesirable, because variations in diameter from workpiece to workpiece may result in variations in workpiece position, since the position at which the workpiece is grasped depends on the difference in diameter between the open collet head and the workpiece.

DEAD-LENGTH™ collet chucks are often used to eliminate the inconvenience associated with collet head axial movement. In such chucks, the collet head is held in an axially fixed position while a selectively axially moveable collet closing sleeve is moved. The collet closing sleeve has cam surfaces which engage those of the collet head, forcing the collet head to open or close, depending on the collet closing sleeve's direction of movement. Typically, collet closing sleeves are moved forward to close the collet head and rearward to open it.

In most DEAD-LENGTH™ collet chucks, the collet head gripping segments are held in an axially fixed position by a cap which is bolted or otherwise secured to the forward end of the collet closing sleeve. The collet head segments bear against the cap, and since they cannot move forward because of the cap, they are forced to either open or close in response to movement of the collet closing sleeve. When the collet head needs to be changed, for example, to replace the seals between segments, the cap must be removed. Although some caps are designed for quick removal and replacement, the cap is an intricate part and its removal may be an inconvenience to the user.

DEAD-LENGTH™ collet head is typically mounted on the spindle of a user's turning machine and is connected to the draw bar of the machine. The link-up components that connect the collet closing sleeve to the user's spindle and draw bar may need to be specially fabricated for each user's machine.

SUMMARY OF THE INVENTION

One aspect of the invention relates to a collet chuck assembly with an axially fixed collet head. The collet chuck assembly comprises a spindle adapter body, a sleeve assembly, one or more resilient elastic members and a bushing member.

The sleeve assembly of the collet chuck assembly has outer surfaces constructed and adapted to slidingly engage corresponding inner surfaces of the spindle adapter body. This sliding engagement facilitates axial movement along a collet assembly movement axis. The sleeve assembly defines an interior collet head receiving passage which has engaging, motion-translating surfaces on at least a portion. The sleeve assembly also comprises a rear portion having one or more bearing surfaces extending perpendicularly with respect to the collet assembly movement axis. A set of projections extend from the rear portion substantially parallel to the collet assembly movement axis. Resilient elastic members are installed between the bearing surfaces of the sleeve assembly and corresponding bearing surfaces of the spindle adapter body. A bushing member is constructed and arranged to be removably and fixedly mounted within the interior cavity of the spindle adapter body proximate to the sleeve assembly. The bushing member has a central passage positioned and adapted to be operationally contiguous with the collet head receiving passage of the sleeve assembly. The central passage has structure constructed and arranged to secure a collet head against movement along the collet assembly movement axis. The bushing member also defines one or more passages arranged to receive the projections of the sleeve assembly so as to place the sleeve assembly in motion-transmitting relation with motion-generating or transmitting structures connected to the turning machine.

Another aspect of the invention relates to a turning machine. The turning machine comprises a spindle, a drawbar, and the collet chuck assembly described above.

A further aspect of the invention relates to an actuation mechanism for a collet head. The actuation mechanism comprises a sleeve assembly adapted to move between first and second positions along a first movement axis, the first position establishing an open position of the collet head and the second position establishing a closed position of the collet head. The sleeve assembly has engaging, motion-translating surfaces constructed and arranged to engage corresponding surfaces of the collet head. The sleeve assembly also has projections constructed and arranged to be inserted through a fixed member so as to transmit motion to the sleeve assembly. Additionally, the actuation mechanism comprises one or more resilient elastic members that are adapted to bear against an outer surface of the sleeve assembly and a bearing surface of another structure while resiliently resisting movements of the sleeve assembly between the first and second positions.

These and other aspects of the invention will be described below in greater detail.

BRIEF DESCRIPTION OF THE DRAWINGS

The present invention will be described with reference to the following Drawings, in which like reference numerals represent like features throughout the several views, and in which.

DETAILED DESCRIPTION

Figure 1:
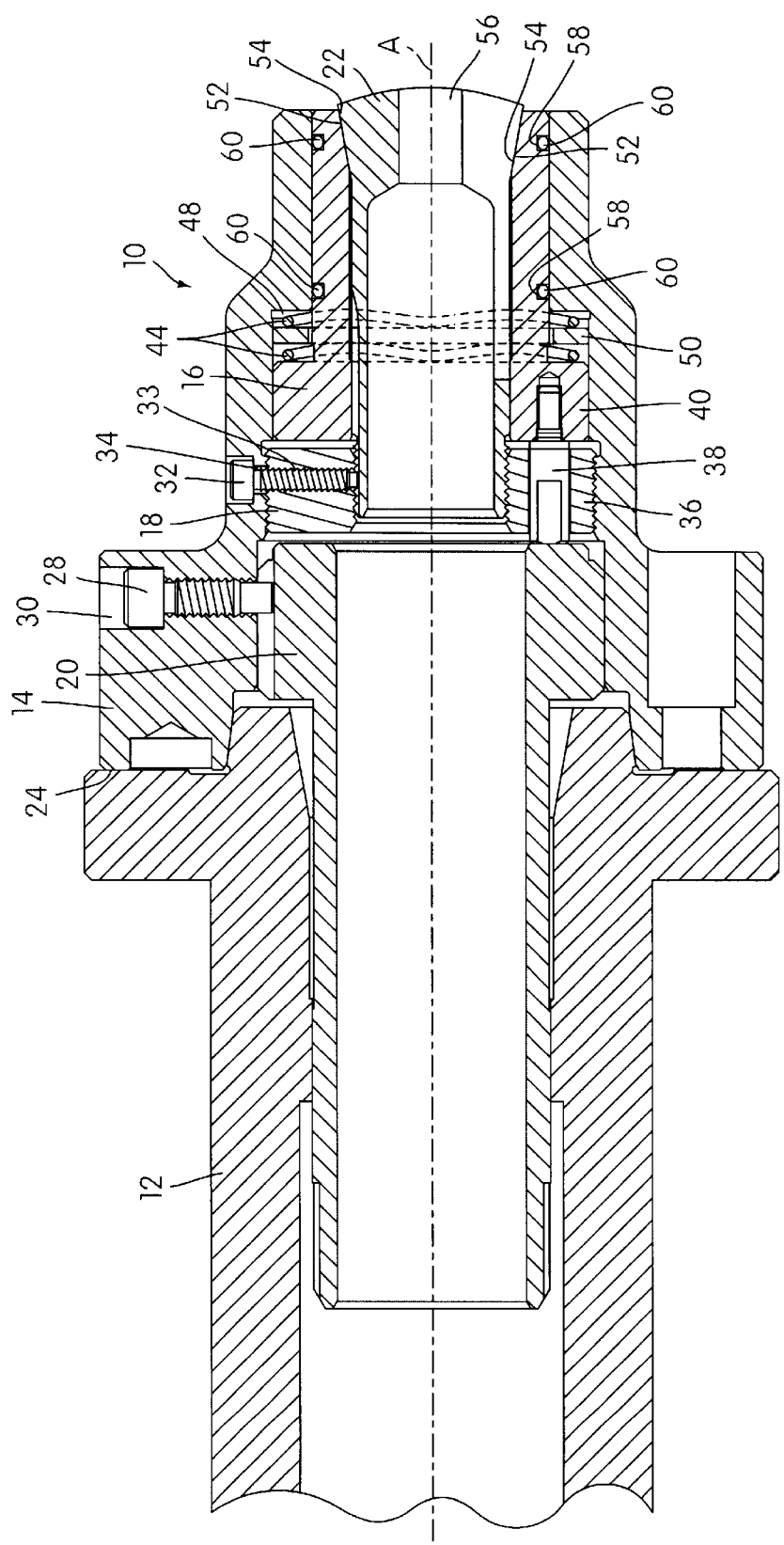
FIG. 1 is an axial cross-sectional view of a collet chuck assembly according to the present invention with the collet head in the closed position.

A collet assembly with an axially fixed collet head, generally indicated at 10, is shown in the axial cross-sectional view of FIG. 1. In the view of FIG. 1, the collet assembly 10 is installed on the spindle 12 of a turning machine. The collet assembly 10 itself comprises a spindle adapter body 14, a sleeve-and-pin assembly 16, a threaded bushing 18, a drawbar link-up 20, and a collet head 22. These components, their functions, and the operation of the collet assembly 10 will be described below.

In the description that follows, certain directional terms, such as "rear," "forward," "top," "bottom," "horizontal," and "longitudinal" will be used. These terms refer only to the coordinate system of the Figures, and are used to simplify the description. Where these terms are used to describe a force, direction, or other quantity, only one component of the force, direction or other quantity need be in the indicated direction, unless otherwise stated. Additionally, the term "axially," as used in the following description, is used with respect to the horizontal axis A shown in FIG. 1.

Figure 2:
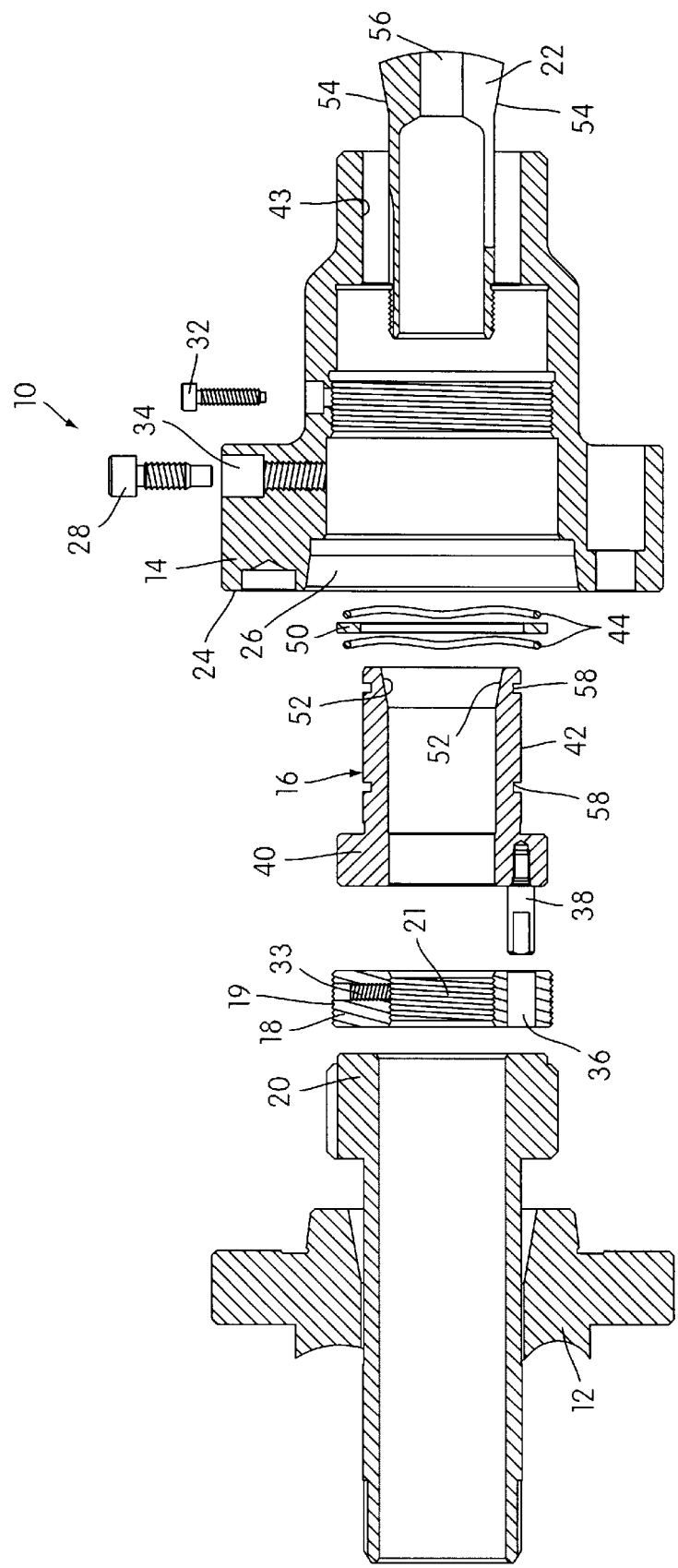
FIG. 2 is an exploded cross-sectional view of the collet chuck assembly of FIG. 1.

An exploded view of the collet assembly 10 components is shown in FIG. 2. As shown in FIGS. 1 and 2, a rearward end 24 of the spindle adapter body 14 is adapted to be bolted or otherwise connected to the spindle 12. The spindle adapter body 14 has an interior cavity 26 formed axially through its length. The interior cavity 26 of the spindle adapter body 14 is dimensioned appropriately to receive the other components of the collet assembly 10.

The rearward end 24 of the spindle adapter body 14 receives the drawbar link-up 20. A keyscrew 28 extends through a radial hole 30 provided in the spindle adapter body 14 to key the drawbar link-up 20 to the spindle adapter body 14, however, the connection between the spindle adapter body 14 and the drawbar link-up 20 is such that the drawbar link-up 20 may move axially within the interior cavity 26 of the spindle adapter body 14.

Those of ordinary skill in the art will realize that the drawbar link-up 20 is a component of the turning machine itself, not a component of the collet assembly 10. Although one possible exemplary configuration of the drawbar link-up 20 is illustrated in the Figures, the configuration will vary, and may take many forms. In general, the collet assembly 10 may be adapted to function with a drawbar link-up 20 of any configuration.

Figure 5:
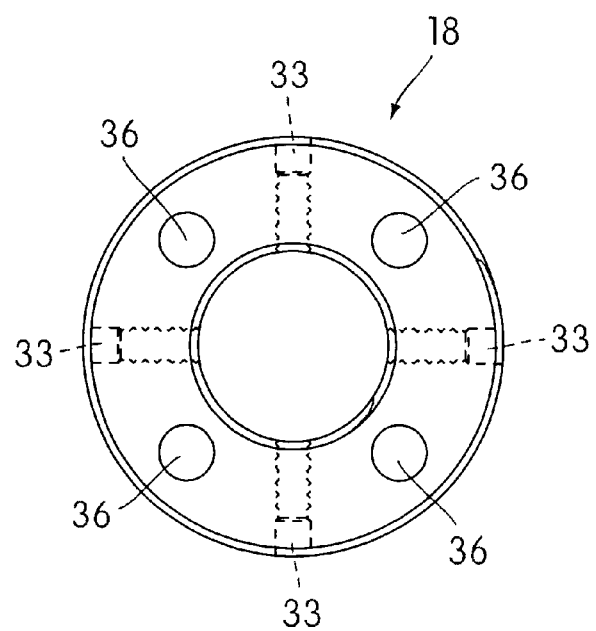
FIG. 5 is a plan view of a threaded bushing according to the invention.

FIG. 5 is a plan view of the threaded bushing 18. As shown in FIG. 5, the threaded bushing 18 is an annular component that mates with the spindle adapter body 14 just forward of the drawbar link-up 20. More particularly, the threaded bushing 18 has threads 19 on its outer diameter which are adapted to threadedly engage corresponding screw threads provided on wall portions of the interior cavity 26. The threaded bushing 18 also includes threads 21 on its inner diameter which are sized and adapted to threadedly engage and secure the rearward portion of the collet head 22 by means of corresponding threads that are provided on the rearward outer diameter of the collet head. The engagement of the threads 21 on the threaded bushing 18 with the threads of the collet head 22 prevents the collet head 22 from moving axially. (The threads 19, 21 of the threaded bushing 18 are most clearly seen in FIG. 2.)

Additionally, in order to prevent rotational movement of the collet head 22 from loosening the collet head 22 in the threaded bushing 18, the collet head 22 is typically keyed. In order to engage the key on the collet head 22 and thus prevent the collet head 22 from rotating, the spindle adapter body 14 defines four circumferentially-spaced threaded through-holes 34 that extend through the spindle adapter body 14. Four corresponding circumferentially-spaced threaded radial holes 33 are provided in the threaded bushing 18. The holes 33 of the threaded bushing 18 are positioned so as to be contiguous with those of the spindle adapter body 14 when the threaded bushing 18 is installed in the spindle adapter body 14. When the collet head 22 is inserted into the collet chuck assembly 10, its keyway is rotated until it coincides with one of the sets of through-holes 34,33 and a keyscrew 32 is inserted into that set of through-holes 34,33, thus preventing the collet head 22 from moving axially. The other three sets of through-holes 34,33 (i.e., those through-holes that do not correspond to the position of the collet head key) would then be filled with machine screws, which would prevent debris from entering the spindle adapter body 14 and would also help to secure the threaded bushing 18 in place.

The threaded bushing 18 acts as an interface between the drawbar link-up 20 and the sleeve-and-pin assembly 16 by means of a number of through-holes 36 extending axially through the thickness of the threaded bushing 18. Pins 38 are fixed at one end in the sleeve-and-pin assembly 16 and extend rearwardly from the sleeve-and-pin assembly 16. The pins 38 may be fixed to the sleeve-and-pin assembly 16 in any number of ways, for example, by way of a threaded connection between the two, or, in some cases, by means of an adhesive. One way to secure the two components is to provide corresponding threads on the pins 38 and sleeve 16 and then secure the pins 38 in place with a small amount of an adhesive, such as a cyanoacrylate adhesive. The pins 38 and sleeve 16 may also be integrally formed.

The through-holes 36 of the threaded bushing 18 and pins 38 of the sleeve-and-pin assembly 16 are located in corresponding positions with respect to one another, such that when the sleeve-and-pin assembly 16 is operatively positioned just forward of the threaded bushing 18 (as shown in FIG. 1), the pins 38 extend rearwardly through the through-holes 36 of the threaded bushing 18. In this way, when the drawbar link-up 20 moves axially forward and contacts the pins, the sleeve-and-pin assembly 16 moves axially forward as well.

Figure 3:
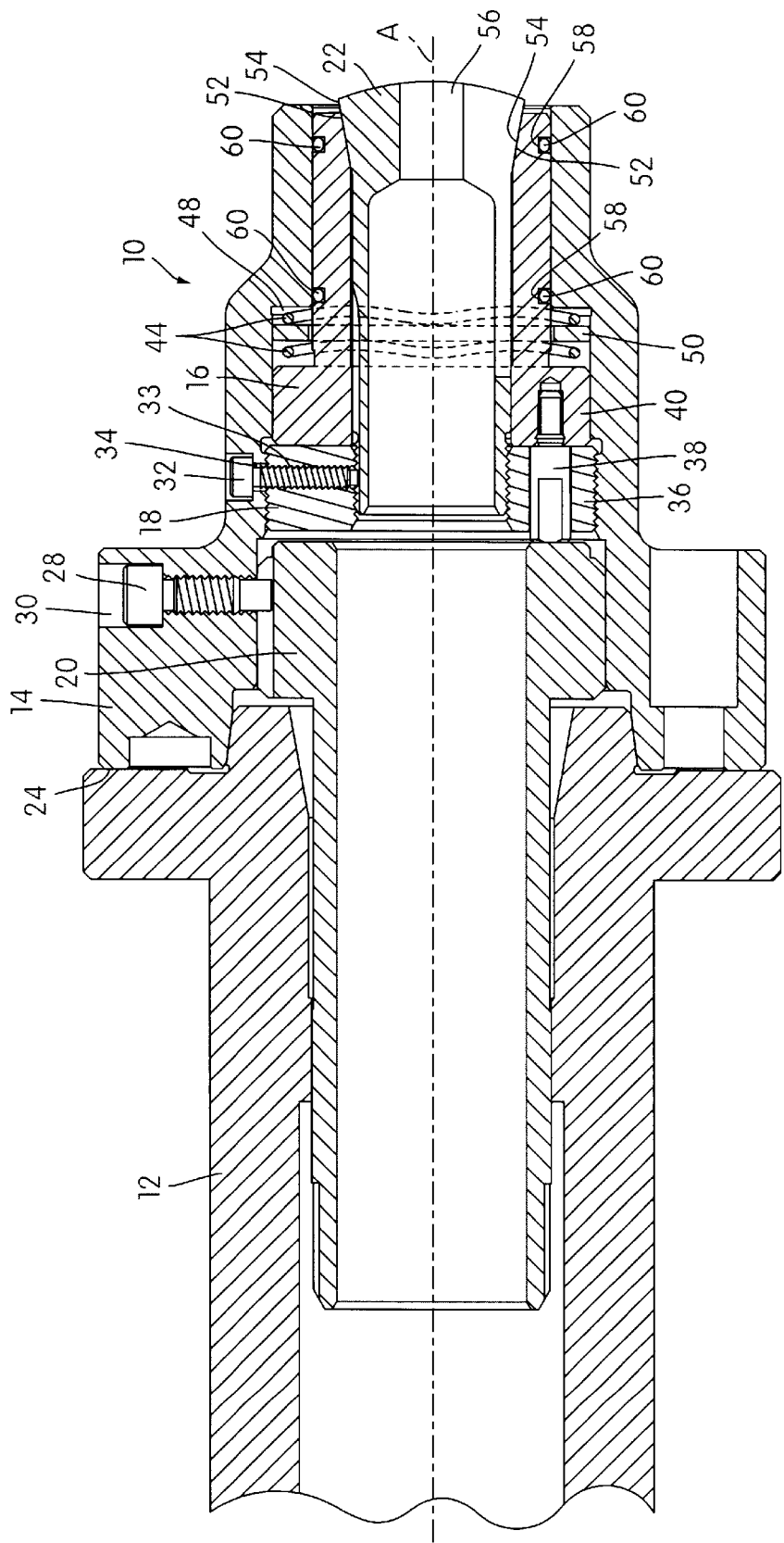
FIG. 3 is an axial cross-sectional view of the collet chuck assembly similar to the view of FIG. 1 with the collet head in the open position.
Figure 4:
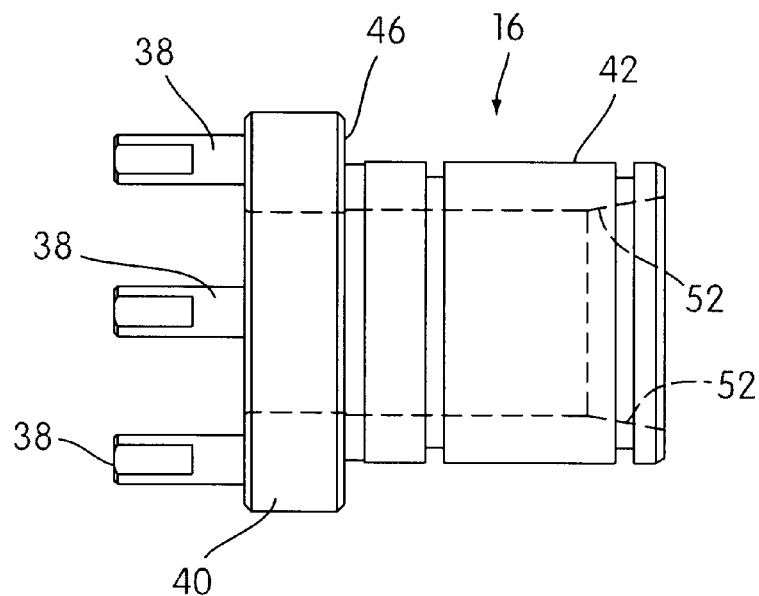
FIG. 4 is an elevational view of a sleeve-and-pin assembly of the collet chuck assembly.

The sleeve-and-pin assembly 16 is shown in more detail in FIG. 4, a side elevational view. The sleeve-and-pin assembly 16 is hollow and generally tubular in shape and has outer surfaces As shown, it has a flanged rear portion 40 from which the pins 38 protrude rearwardly. The sleeve-and-pin assembly 16 has a total of four circumferentially-spaced pins 38, although only three are shown in the plan view of FIG. 4. More or fewer pins 38 may be used. When operatively positioned just forward of the threaded bearing 18, the exterior surface 42 of the sleeve-and-pin assembly 16 is designed and contoured to slidingly engage interior surfaces 43 of the spindle adapter body 14 such that the sleeve-and-pin assembly 16 may slide axially relative to the spindle adapter body 14. In the operational position of the sleeve-and-pin assembly 16, the pins 38 extend in a direction generally parallel with the axis A of FIGS. 1 and 3.

Although the term "pins" is used with reference to the sleeve-and-pin assembly 16, the function of the "pins" shown in the Figures may be performed by rearwardly-extending projections of any shape, and the threaded bushing 18 may be provided with apertures or passages of any appropriate size or shape to accommodate those projections.

When the sleeve-and-pin assembly 16 is operatively positioned, a set of wave wire springs 44 (Smalley Steel Ring Company, Lake Zurich, Ill., USA) are inserted between the sleeve-and-pin assembly 16 and the spindle adapter body 14 such that they bear against the forward flange surface 46 of the sleeve-and-pin assembly 16 and the corresponding interior vertical bearing surface 48 of the spindle adapter body 14. (Wave wire springs 44 are compression springs formed with a single turn of spring wire that has a plurality of distinct waves therein.) In the illustrated embodiment, two wave wire springs 44 are provided, each wave wire spring 44 capable of resiliently resisting, for example, an applied force of about 200 pounds. The two wave wire springs 44 are separated by a washer 50. (Together, the two wave wire springs 44 are capable of resiliently resisting a force of about 400 pounds.) More wave wire springs 44 could be used in series if additional force bias is desired. The wave wire springs 44 provide a resilient spring bias that biases the pin-and-sleeve assembly 16 rearwardly, such that the pins 38 contact the drawbar link-up 20 and the drawbar link-up 20 moves the sleeve-and-pin assembly 16 forward against the bias of the wave wire springs 44. The wave wire springs 44 provide a relatively large spring bias and require relatively little space. However, conventional compression springs may be used if more space is provided for their installation.

As shown in FIGS. 1 and 2, the sleeve-and-pin assembly 16 is configured to receive the collet head 22 such that interior cam surfaces 52 of the sleeve-and-pin assembly 16 slidingly engage corresponding cam surfaces 54 of the collet head 22. Although the cam surfaces 52, 54 illustrated in the Figures are frustro-conical and of continuous slope, other types of cam surfaces may be used. In general, any engaging, motion-translating surface may be used as a cam surface. The collet head 22 extends rearwardly from the front opening 56 of the sleeve-and-pin assembly 16, beyond the flanged rear portion 40 of the sleeve-and-pin assembly 16, and is held in an axially fixed position by the keyscrew 32, as described above.

The sleeve-and-pin assembly 16 also provides two circumferential grooves 58 which are constructed and arranged to accommodate o-ring-type wiping seals 60. The seals 60 prevent debris from lodging between the sleeve-and-pin assembly 16 and the spindle adapter body 14 by sealingly engaging the spindle adapter body 14. The interface between the sleeve-and-pin assembly 16 and the spindle adapter body 14 may be lubricated with a suitable viscous grease, in which case the seals 60 would also prevent the grease from leaking.

The operation of the collet assembly 10 can be seen in FIG. 1, in which the collet head 22 is in a closed, workpiece-gripping position, and in FIG. 3, in which the collet head 22 is in an open position. In the workpiece-gripping position of FIG. 1, the drawbar link-up 20 is extended forwardly and is in contact with the pins 38 of the sleeve-and-pin assembly 16. The position of the drawbar link-up 20, and the resulting force on the pins 38 and the sleeve-and-pin assembly 16, forces the sleeve-and-pin assembly 16 forward against the spring bias of the wave wire springs 44. (The wave wire springs 44, which are shown partially in phantom, are partially compressed in the view of FIG. 1.) The sliding engagement of the cam surfaces 52, 54 of the collet head 22 and the sleeve-and-pin assembly 16 forces the circumferentially-spaced segments of the collet head 22 closer together, which decreases the diameter of the order hole 56 of the collet head 22. The amount of axial travel between the positions illustrated in FIGS. 1 and 3 may be, for example, about 1/16 inch.

FIG. 3 shows the open position of the collet head 22. In FIG. 3, the drawbar link-up 20 is retracted and is thus not driving the pins 38 of the sleeve-and-pin assembly 16 forward. Consequently, because there is substantially reduced force on the pins 38 (and thus, the sleeve-and-pin assembly 16), the spring bias of the wave wire springs 44 forces the sleeve-and-pin assembly 16 to retract rearwardly. (The wave wire springs 44 are substantially uncompressed in FIG. 3, relative to their position in FIG. 1.) As the sleeve-and-pin assembly 16 retracts, the sliding engagement of its cam surfaces 52 with the cam surfaces of the collet head 22 cause the distance between the circumferentially-spaced segments of the collet head 22 to increase, which increases the diameter of the order hole 56 of the collet head 22.

Because the collet head 22 is held in an axially fixed position by the threaded bushing 18, there is no need to provide a cap or cap assembly for the collet assembly 10. In general, the collet assembly 10 may be used with a variety of standard collet heads 22, including, for example, the 5C, 16C, 20C, 25C, and 3J. (Sold, for example, by Hardinge, Inc., Elmira, N. Y., USA.) Additionally, because no direct connection is required between the drawbar link-up 20 and the spindle adapter body 14, the components within the spindle adapter body 14 may be assembled and precisely adjusted during manufacture, independent of installation on a machine. Precise adjustment of the spindle adapter body 14 and its components during manufacture makes field installation easier than with prior art collet assemblies. Additionally, the link-up 20 itself is easily installed on a user's turning machine.

With the exception of the wave wire springs 44, the components of the collet chuck assembly 10 are typically machined from mild steel to appropriate tolerances and then heat-treated to desired hardnesses and/or other material properties. The various components may be made in a variety of sizes in order to accommodate differently-sized collet heads 22.

Although the invention has been described with respect to exemplary embodiments, those of ordinary skill will realize that variations and modifications are possible within the scope of the invention. The embodiments described herein are intended to be exemplary only and are not to be construed as limiting.

What is claimed is:

1. A collet chuck assembly, comprising:
    a spindle adapter body constructed and arranged to be mounted on the spindle of a turning machine, said spindle adapter body defining therein an interior cavity, an elongate axis of said spindle adapter body defining a collet assembly movement axis of the collet chuck assembly;
    a sleeve assembly having outer surfaces constructed and arranged to slidingly engage corresponding inner surfaces of said spindle adapter body for axial movement along the collet assembly movement axis, said sleeve assembly defining an interior collet head receiving passage therein, said collet head receiving passage having engaging, motion-translating surfaces arranged on at least a portion thereof, said sleeve assembly also comprising:
        a rear portion having one or more bearing surfaces extending perpendicularly with respect to the collet assembly movement axis; and
        one or more projections extending from said rear portion substantially parallel to the collet assembly movement axis;

one or more resilient elastic members constructed and arranged to be installed between the bearing surfaces of said sleeve assembly and corresponding bearing surfaces of said spindle adapter body; and a bushing member constructed and arranged to be removably and fixedly mounted within the interior cavity of said spindle adapter body proximate to said sleeve assembly, said bushing having a central passage positioned and adapted to be operationally contiguous with the collet head receiving passage of said sleeve assembly, said central passage having structure constructed and arranged to secure a collet head against movement along the collet assembly movement axis, said bushing member also defining one or more passages therein arranged to receive the one or more projections of said sleeve assembly so as to place said sleeve assembly in motion-transmitting relation with motion-generating or transmitting structures connected to the turning machine.

2. The collet chuck assembly of claim 1, further comprising a collet head having engaging, motion-translating surfaces constructed and arranged to engage the engaging, motion-translating surfaces of said sleeve assembly.

3. The collet chuck assembly of claim 1, further comprising a drawbar link-up member having a first end adapted to be connected to a drawbar of the spindle of the turning machine and a second end having at least one surface adapted to transmit motion along the collet assembly movement axis to the projections of said sleeve assembly.

4. The collet chuck assembly of claim 1, wherein said one or more resilient elastic members comprise one or more wave wire springs.

5. The collet chuck assembly of claim 4, wherein each of said one or more wave wire springs is separated from others of said one or more wave wire springs by a washer.

6. The collet chuck assembly of claim 3, wherein the spindle adapter body defines one or more sets of radially-extending threaded holes therein, a first set of threaded holes being circumferentially spaced about said spindle adapted body operationally proximate to said bushing member and a second set of threaded holes being operationally proximate to said sleeve assembly.

7. The collet chuck assembly of claim 6, wherein the central passage of said bushing member is threaded to secure the collet head against movement along the collet assembly movement axis.

8. The collet chuck assembly of claim 7, wherein the bushing member defines circumferentially-spaced, radially-extending threaded holes arranged so as to be operationally contiguous with the first set of threaded holes of said spindle adapter body.

9. The collet chuck assembly of claim 1, wherein threads are provided on an outer surface of said bushing member.

10. The collet chuck assembly of claim 9, wherein a portion of the interior cavity of said spindle adapter body to which said bushing member is constructed and arranged to be mounted is threaded, the threads of said interior cavity corresponding to the threads of the outer surface of said bushing member.

11. The collet chuck assembly of claim 1, wherein the sleeve assembly is provided with one or more circumferential seal grooves in said outer surfaces, said seal grooves constructed and arranged to accommodate sealing members.

12. The collet chuck assembly of claim 11, further comprising annular sealing members constructed and arranged to rest in said seal grooves in sealing relation with the outer surfaces of said sleeve assembly and the interior cavity of said spindle adapter body.

13. A turning machine, comprising:
a spindle including a drawbar; and
a collet chuck assembly, comprising:
a spindle adapter body constructed and adapted to be mounted on the spindle, said spindle adapter body defining therein an interior cavity, an elongate axis of said spindle adapter body defining a collet assembly movement axis of the collet chuck assembly;
a sleeve assembly having outer surfaces constructed and arranged to slidingly engage corresponding inner surfaces of said spindle adapter body for axial movement along the collet assembly movement axis, said sleeve assembly defining an interior collet head receiving passage therein, said collet head receiving passage having engaging, motion-translating surfaces arranged on at least a portion thereof, said sleeve assembly also comprising:
a rear portion having one or more bearing surfaces extending perpendicularly with respect to the collet assembly movement axis; and
one or more projections extending from said rear portion substantially parallel to the collet assembly movement axis;
one or more resilient elastic members constructed and arranged to be installed between the bearing surfaces of said sleeve assembly and corresponding bearing surfaces of said spindle adapter body; and
a bushing member constructed and arranged to be removably and fixedly mounted within the interior cavity of said spindle adapter body proximate to said sleeve assembly, said bushing having a central passage positioned and adapted to be operationally contiguous with the collet head receiving passage of said sleeve assembly, said central passage having structure constructed and arranged to secure a collet head against movement along the collet assembly movement axis, said bushing member also defining one or more passages therein arranged to receive the one or more projections of said sleeve assembly so as to place said sleeve assembly in motion-transmitting relation with motion-generating or transmitting structures connected to the turning machine.

14. The turning machine of claim 13, further comprising a collet head having engaging, motion-translating surfaces constructed and arranged to engage the engaging, motion-translating surfaces of said sleeve assembly.

15. The turning machine of claim 13, further comprising a drawbar link-up member having a first end adapted to be connected to a drawbar of the spindle of the turning machine and a second end having at least one surface adapted to transmit motion along the collet assembly movement axis to the rearwardly-extending projections of said sleeve assembly.

16. The turning machine of claim 13, wherein said one or more resilient elastic members comprise one or more wave wire springs.

17. The turning machine of claim 16, wherein each of said one or more wave wire springs is separated from others of said one or more wave wire springs by a washer.

18. The turning machine of claim 15, wherein the spindle adapter body defines one or more sets of radially-extending threaded holes therein, a first set of threaded holes being circumferentially spaced about said spindle adapted body operationally proximate to said bushing member and a second set of threaded holes being operationally proximate to said sleeve assembly.

19. The turning machine of claim 18, wherein the central passage of said bushing member is threaded to secure the collet head against movement along the collet assembly movement axis.

20. The turning machine of claim 18, wherein the bushing member defines circumferentially-spaced, radially-extending threaded holes arranged so as to be operationally contiguous with the first set of threaded holes of said spindle adapter body.

21. The turning machine of claim 13, wherein threads are provided on an outer surface of said bushing member.

22. The turning machine of claim 21, wherein a portion of the interior cavity of said spindle adapter body to which said bushing member is constructed and arranged to be mounted is threaded, the threads of said interior cavity corresponding to the threads of the outer surface of said bushing member.

23. The turning machine of claim 13, wherein the sleeve assembly is provided with one or more circumferential seal grooves in said outer surfaces, said seal grooves constructed and arranged to accommodate sealing members.

24. The turning machine of claim 23, further comprising annular sealing members constructed and arranged to rest in said seal grooves in sealing relation with the outer surfaces of said sleeve assembly and the interior cavity of said spindle adapter body.

25. An actuation mechanism for a collet head, comprising:

a sleeve assembly constructed and adapted to move between first and second positions along a first movement axis, the first position establishing an open position of the collet head and the second position establishing a closed position of the collet head, said sleeve assembly having engaging, motion-translating surfaces constructed and arranged to engage corresponding surfaces of the collet head, said sleeve assembly also having projections constructed and arranged to be inserted through a fixed member so as to transmit motion to said sleeve assembly; and one or more resilient elastic members coupled to said sleeve assembly and adapted to bear against an outer surface of said sleeve assembly and a bearing surface of another structure, said one or more resilient elastic members being adapted to resiliently resist a movement of said sleeve assembly between the first and second positions thereof.

26. The actuation mechanism of claim 25, wherein said one or more resilient elastic members are wave wire springs.

\* \* \* \* \*